United States Patent
Takeda et al.

(10) Patent No.: US 6,461,741 B1
(45) Date of Patent: Oct. 8, 2002

(54) GRAIN-ORIENTED ELECTROMAGNETIC STEEL SHEET WITH EXCELLENT COATING PROPERTIES AND PROCESS FOR ITS MANUFACTURE

(75) Inventors: Kazutoshi Takeda, Himeji; Shuichi Yamazaki, Futtsu; Hideyuki Kobayashi, Himeji; Hiroyasu Fujii, Kitakyushu, all of (JP)

(73) Assignee: Nippon Steel Corporation, Tokyo (JP)

( * ) Notice: Subject to any disclaimer, the term of this patent is extended or adjusted under 35 U.S.C. 154(b) by 10 days.

(21) Appl. No.: 09/661,003

(22) Filed: Sep. 13, 2000

(30) Foreign Application Priority Data

Sep. 14, 1999 (JP) .............................. 11-261050
May 10, 2000 (JP) ....................... 2000-137551

(51) Int. Cl.⁷ .............................. B32B 15/04; B05D 5/12
(52) U.S. Cl. .................. 428/469; 427/127; 428/687; 428/471; 428/472; 428/689; 428/692; 428/699; 428/701; 428/900; 428/928
(58) Field of Search ............................ 428/687, 469, 428/471, 472, 689, 692, 699, 701, 900, 928; 427/127

(56) References Cited

FOREIGN PATENT DOCUMENTS

| | | |
|---|---|---|
| EP | 0 625 582 A3 | 11/1994 |
| JP | 7-207453 A * | 8/1995 |

OTHER PUBLICATIONS

Patent Abstracts of Japan, vol. 1998, No. 2, Jan. 30, 1998 (JP 09 272982).
Patent Abstracts of Japan, vol. 1996, No. 2, Feb. 29, 1996 (JP 07 278831).
Patent Abstracts of Japan, vol. 1999, No. 13, Nov. 30, 1999 (JP 11 236682).
Patent Abstracts of Japan, vol. 1996, No. 2, Feb. 29, 1996 (JP 07 278830).
Patent Abstracts of Japan, vol. 1997, No. 2, Feb. 28, 1997 (JP 08 277475).

* cited by examiner

Primary Examiner—Robert R. Koehler
(74) Attorney, Agent, or Firm—Kenyon & Kenyon

(57) ABSTRACT

A high permeability grain-oriented electromagnetic steel sheet with a higher tension-imparting effect and more excellent cohesion and magnetic properties compared to the prior art, which also maintains sufficient corrosion resistance to withstand practical use; the grain-oriented electromagnetic steel sheet has on its surface an insulation coating comprising a first layer composed mainly of a divalent or trivalent metal hydrogen phosphate salt and silica, and a second layer composed mainly of aluminum borate and leaving a surface roughness of 0.1 $\mu$m–0.35 $\mu$m in terms of Ra (center like average roughness).

11 Claims, No Drawings

GRAIN-ORIENTED ELECTROMAGNETIC STEEL SHEET WITH EXCELLENT COATING PROPERTIES AND PROCESS FOR ITS MANUFACTURE

BACKGROUND OF THE INVENTION

1. Field of the Invention

The present invention relates to a grain-oriented electromagnetic steel sheet with satisfactory coating properties including cohesion and corrosion resistance and a satisfactory permeability, which can carry and insulation coating with high imparted tension and has a low iron loss, and to a process for its manufacture.

2. Description of the Related Art

Grain-oriented electromagnetic steel sheets have their easily magnetized axes aligned in the rolling direction, and are widely used in electrical devices such as transformers and the like because of their low iron . less. It is known that imparting tension in the rolling direction of a grain-oriented electromagnetic steel sheet further reduces the iron loss and, as disclosed in Japanese Unexamined Patent Publications No. 48-39338 and No. 50-79442, there have been proposed methods of improving iron loss by applying and baking a coating solution composed mainly of aluminum phosphate and colloidal silica on the steel sheet surface, and utilizing the thermal expansion difference to impart tension.

Recently, in Japanese Unexamined Patent Publication No. 6-65755, there has been disclosed a method for obtaining a grain-oriented electromagnetic steel sheet that maintains excellent electromagnetic properties, and allows greater tension to be imparted to steel sheets, by forming an insulation coating composed mainly of aluminum borate on the steel sheet surface.

However, while grain-oriented electromagnetic steel sheets with insulation coatings composed mainly of aluminum borate have more excellent tension-imparting effects than grain-oriented electromagnetic steel sheets bearing insulation coatings composed mainly of aluminum phosphate and colloidal silica, it has been shown that the cohesion, corrosion resistance and space factor are inferior.

As concerns the cohesion, Japanese Unexamined Patent Publication No. 7-207953 discloses a method wherein as aluminum borate-based insulation coating is formed on a grain-oriented electromagnetic steel sheet bearing an insulation coating, composed mainly of a forsterite coating, wherein light acid pickling thereof is followed by formation of a coating composed mainly of a phosphate salt or a phosphate salt and colloidal silica to a coverage of 0.5 g/m$^2$ to 3.0 g/m$^2$ on one side, and then a coating solution comprising mainly alumina sol and boric acid is coated and baked thereon.

This technique is aimed at forming, with satisfactory cohesion, an insulating coating that imparts a high degree of tension, such as an aluminum borate coating, on a finished annealed coating composed mainly of forsterite; by applying and baking a coating solution composed mainly of a phosphate salt or a phosphate salt and colloidal silica on the forsterite coating whose mechanical strength has been lowered by acid pickling, to thus exhibit an effect as a maintenance material, the cohesion is improved through maintenance of the forsterite coating into which cracks have been introduced by etching. Consequently, since no modifications are made to the conditions for applying and baking the coating solution composed mainly of a phosphate salt or a phosphate salt and colloidal silica, no improvement can be expected in the corrosion resistance or space factor.

As concerns corrosion resistance, Japanese Unexamined Patent Publication No. 9-272982 discloses a technique whereby a steel sheet is provided with a coating g comprising a first layer containing an aluminum borate and a second layer containing aluminum phosphate, formed thereon.

This technique is aimed at imparting tension to the steel sheet by the aluminum borate coating of the first layer, while the main purpose of the second layer is to improve the corrosion resistance. That is, formation of the second layer on the aluminum borate coating that has inferior corrosion resistance is intended to overcome its drawbacks.

However, since the aluminum borate coating includes excess boron oxide, formation of the second layer containing aluminum phosphate by application and baking results in partial dissolution of the aluminum borate coating of the first layer, thus impairing the corrosion resistance; it is therefore quite difficult, from an industrial standpoint, to form an aluminum phosphate coating by application after formation of the aluminum borate coating, while the cost of this sophisticated technique is also high.

When an aluminum borate coating is formed on an aluminum phosphate coating on a common electromagnetic steel sheet without controlling the application and baking conditions, increasing the coverage to improve the corrosion resistance sometimes results in a poorer space factor as well as poorer cohesion, while reducing the coverage can make it impossible to achieve adequate corrosion resistance; according to the disclosure in this patent, the effect of improved corrosion resistance is based on evaluation upon standing for one week in a thermo-hygrostat at 50° C., 91% RH, but since coil transport often involves shipping, evaluation in a thermo-hygrostat is insufficient and the level of corrosion resistance must be evaluated based on a salt spray test.

Japanese Unexamined Patent Publication No. 9-335679 discloses a technique for coating low iron loss grain-oriented electromagnetic steel sheets with an aluminum borate-containing oxide coating, wherein satisfactory smoothness and cohesion are achieved with good workability during transformer manufacture, by specifying the alumina sol particle shapes.

This patent clearly demonstrates that the shape of the alumina sol particles affects the surface condition of the aluminum borate-containing oxide coating, and it provides a process for manufacture of grain-oriented electromagnetic steel sheets having coatings with satisfactory outer appearance, excellent cohesion and a high tension-imparting effect. Specifically, it is intended to improve the coating surface conditions by way of the alumina sol particle shape. However, while the process allows improvement in the space factor, the corrosion resistance is insufficient.

SUMMARY OF THE INVENTION

It is an object of the present invention to provide a grain-oriented electromagnetic steel sheet having a coating that maintains a more excellent tension-imparting effect than coatings obtained by the conventional methods, satisfactory cohesion and corrosion resistance that can withstand practical use, as well as a grain-oriented electromagnetic steel sheet having a coating that maintains a satisfactory space factor.

The present invention is based on the discovery that a grain-oriented electromagnetic steel sheet with excellent film surface roughness and film corrosion resistance can be obtained by controlling the baking conditions when applying and baking a coating solution composed mainly of a phosphate salt or a phosphate salt and colloidal silica on a grain-oriented electromagnetic steel sheet, prior to forming an insulating film with an excellent tension effect composed mainly of aluminum borate.

In other words, the present invention encompasses the following construction.

(1) A grain-oriented electromagnetic steel sheet with excellent coating properties, characterized in that the steel sheet surface has an insulation coating comprising a first layer composed mainly of a divalent or trivalent metal hydrogen phosphate salt and silica, and a second layer composed mainly of aluminum borate.

(2) A grain-oriented electromagnetic steel sheet with excellent coating properties according to (1), characterized in that the hydrogen phosphate salt of the first layer is one or a mixture of two or more from among aluminum primary phosphate, magnesium primary phosphate and calcium primary phosphate.

(3) A grain.-oriented electromagnetic steel sheet with excellent coating properties according to (1) or (2), characterized in that the first layer further contains free phosphoric acid.

(4) A grain-oriented electromagnetic steel sheet with excellent coating properties according to any one of (1) to (3) above, characterized in that the first layer further contains chromium oxide.

(5) A grain-oriented electromagnetic steel sheet with excellent coating properties, characterized in that the steel sheet surface has an insulation coating comprising a first layer composed mainly of a divalent or trivalent metal hydrogen phosphate salt and silica, and a second layer composed mainly of aluminum borate, and having a surface roughness of 0.1 μm–0.50 μm in terms of Ra (center line average roughness).

(6) A grain-oriented electromagnetic steel sheet with excellent coating properties according to (5), characterized in that the hydrogen phosphate salt of the first layer is one or a mixture of two or more from among aluminum primary phosphate, magnesium primary phosphate anal calcium primary phosphate.

(7) A grain-oriented electromagnetic steel sheet with excellent coating properties according to (5) or (6), characterized in that the first layer further contains free phosphoric acid.

(8) A grain-oriented electromagnetic steel sheet with excellent coating properties according to gay one of (5) to (7) above, characterized in that the first layer further contains chromium oxide.

(9) A process for the manufacture of a grain-oriented electromagnetic steel sheet with excellent properties, characterized in that, for formation of a first layer containing a hydrogen phosphate salt or silica as the main component, a coating solution with that composition is applied to the steel sheet and then dried and baked at 200–600° C., and for subsequent formation of a second layer containing aluminum borate as the main component, a coating solution with that composition is applied thereto and then dried and baked at 800–1200° C.

(10) A process for the manufacture of a grain-oriented electromagnetic steel sheet with excellent properties according to (9), characterized in that for the drying and baking of the second layer, the temperature elevating rate up to 400° C. is from 15° C./sec to 25° C./sec.

DESCRIPTION OF THE PREFERRED EMBODIMENTS

Concrete embodiments of the presence invention will now be explained.

The hydrogen phosphate salt used for the invention contains a dissociable hydrogen atom in the compound, and the metal atom has a valency of 2 or 3. Examples of such hydrogen phosphate salts include aluminum primary phosphate, magnesium primary phosphate and calcium primary phosphate.

Forms of hydrogen phosphate salts include the three forms of primary salts, secondary salts and tertiary salts depending on the dissociating state of the phosphoric acid, but according to the invention it is necessary to use primary or secondary "hydrogen phosphate salts".

Examples of primary salts include magnesium primary phosphate ($Mg(H_2PO_4)_2$) and aluminum primary phosphate ($Al(H_2PO_4)^3$), and an example of a secondary salt is magnesium secondary phosphate ($MgHPO_4$). Since primary salts are generally soluble in water, the primary salts may be used as aqueous solutions for the coating treatment, and according to the invention primary phosphate salts are preferred for use.

The metal element in the hydrogen phosphate salt used for the invention must be a divalent or trivalent element; as divalent metal elements there are preferred alkali earth metals such as magnesium and calcium and as trivalent metal elements there are preferred aluminum and iron, bat there: is no particular limitation to these elements. The transition metal elements also include elements that can assume valences other than divalent or trivalent, and such metal elements may also be used with no problems so long as their divalent or trivalent forms are stable at ordinary temperature and pressure.

The present inventors have achieved the present invention upon finding that, when a hydrogen phosphate salt is present in the first layer, sufficient corrosion resistance is maintained as evaluated by a salt spray test even when the aluminum borate coating is applied and baked as the second layer, and crystallization of the aluminum borate is affected by the free phosphoric acid produced from the hydrogen phosphate salt, thus inhibiting production of microirregularities on the coming surface by crystallization and resulting in a satisfactory space factor.

The first layer of the invention also requires silica in addition to the hydrogen phosphate salt of a specific metal atom. The silica used is preferably colloidal silica, from the standpoint of the uniformity and space factor of the coating, and relatively small particles with a size of 4–30 nm are particularly suitable. The function of the silica is not understood in detail, but it is conjectured that it accelerates the condensation reaction of the hydrogen phosphate salt and forms a dense coating due to its coating formability.

Because colloidal silica is amorphous, it is believed to have an effect on the crystallization process during formation of the aluminum borate coating. The mixing proportion of the hydrogen phosphate salt and silica may be about 5–60%, and is optimally in the range of 34–55%, in terms of solid portion ratio.

According to the invention, the first layer contains a hydrogen phosphate salt including a specific metal atom, and silica, and it is essential for the formation of the layer composed mainly of aluminum borate as the second layer. However, in the present invention, the first layer is not sufficient with only drying and baking of a coating solution containing silica and a hydrogen phosphate salt containing a specific metal atom. It is necessary to leave some of the hydrogen phosphate salt in the first layer according to the present invention.

According to the technique disclosed in Japanese Examined Patent Publication No. 53-28375, it is specified that heat treatment is performed at a temperature of about 800–900° C. either during the application and baking or in a step after the application and baking.

However, when the coating solution is baked at such a high temperature, the condensation reaction of the hydrogen phosphate salt proceeds at an excessive rate, thus not only lowering the reactivity with the aluminum borate during formation of the second layer, but also resulting in gasification of the free excess phosphoric acid by heating during formation of the second layer, possibly causing defects in the coating.

According to the technique disclosed in Japanese unexamined Patent Publication No. 9-272982, it is stated that X-ray diffraction of the second layer confirmed that it comprises silicon oxide, and an amorphous substance, when the aluminum secondary phosphate was baked at 800° C. for 5 minutes in a nitrogen atmosphere containing hydrogen, as the second layer.

However, the present inventors have confirmed that microcrystals precipitate on the aluminum secondary phosphate coating surface of the second layer, and heating at 800° C. for 5 minutes can be expected to crystallize aluminum phosphate, although in a trace amount; it was found that if the upper and lower layers are switched so that aluminum borate of the first layer is at the uppermost surface and the aluminum secondary phosphate of the second layer is facing the steel sheet side, the crystals that have precipitated on the aluminum phosphate surface of the second layer form nuclei which promote crystallization of the aluminum borate coating of the first layer, thus producing irregularities in the coating surface and tending to reduce the space factor.

The optimum temperature for production of the hydrogen phosphate salt in the first layer will depend on the type of hydrogen phosphate salt used and the silica, but the baking temperature for the first layer must be lower than the insulation coating formation temperature for normal grain-oriented electromagnetic steel sheets, and within the range of 200–600° C. At below 200° C. the coating will not be adequately formed and excess moisture will remain risking generation of blowholes, and at above 600° C. the condensation reaction of the hydrogen phosphate salt proceeds, which may prevent the effect of the invention from being exhibited. The temperature range is more preferably 220–380° C.

Aluminum borate is used as the second layer according to the invention, and the purpose for this is to impart tension to the steel sheet.

The aluminum borate used for the invention may have the chemical formula $Al_4B_2O_9$, $Al_{16}B_4O_{33}$, etc., and it may be of one type or a mixture and, in fact, even metastable aluminum borate may be used, and there are no particular restrictions. From the standpoint of imparting tension it is preferred to use crystalline aluminum borate, but there is no problem with amorphous aluminum borate or a mixture of amorphous and crystalline forms.

According to the invention, it is preferred to use the alumina sol disclosed in Japanese Unexamined Patent Publication No. 9-235679 from the standpoint of smoothing the surface of the aluminum borate coating to reduce the surface roughness for an improved ,pace factor. By using an alumina sol with a specific particle form as disclosed in the aforementioned patent, it is possible to obtain a synergistic effect with the surface roughness-lowering effect of the invention.

An iron compound may be introduced into the aluminum borate to improve the moisture resistance. The added iron compound may be iron borate, iron nitrate or the like, and an addition amount of about 1–10% will give a particularly satisfactory result.

According to the invention, the surface roughness is 0.1 μm–0.50 μm in terms of Ra (center line average roughness) The roughness of the steel sheet surface must be restricted to reduce this value to below 0.1 μm, and this will produce greater costs for maintenance and management of the pressure roll and create an impractical situation. If the value is over 0.50 μm, the worsening space factor will become conspicuous. The value is more preferably no greater than 0.35 μm.

The drying and baking temperature for the second layer is in the range of 800–1200° C., in order to give satisfactory coating properties. If the baking temperature is below 800° C., the tension-imparting effect is reduced to possibly prevent any improvement in the electromagnetic properties, and if it is above 1200° C. the mechanical strength of the steel sheet is reduced, possibly resulting in defects.

The temperature elevating rate during drying and baking of the second layer must be in the range of 15° C./sec to 25° C./sec up to 400° C. A temperature elevating rite of less than 15° C./sec may risk reducing the tension-imparting effect, and a rate of over 25° C./sec may risk bubbling of the coating solution.

A grain-oriented electromagnetic steel sheet used for the invention is one that is in a finished annealed condition, having a coating layer composed mainly of forsterite (usually referred to as the primary coating) formed on its surface; it may also be one from which the primary coating is removed by acid-pickling, or one subjected to finishing annealing using an annealing separator containing an additive such as alumina powder or a chloride, under conditions that produce no primary coating; for a "mirror-like" steel sheet surface.

The steel sheet may also be a grain-oriented electromagnetic steel sheet with magnetic domain fragmentation caused by a laser or a groove-forming treatment.

The thicknesses of the first layer and second layer according to the invention are as follows: appropriately the first layer is 0.1–2.0 μm and the second layer is 2.0–5.0 μm, and more preferably the first layer is 0.5–1.0 μm and the second layer is 2.0–3.0 μm.

The function of the invention is not completely understood, but it is believed that the mechanism is as explained below.

For the first layer of the invention it is essential to use a hydrogen phosphate salt containing a specific metal atom. It is a feature of such hydrogen phosphate salts that they allow a dehydration reaction to proceed by baking at high temperature, forming condensed phosphate salts. For example, magnesium primary phosphate when heated is converted to magnesium secondary phosphate according to the following chemical equation.

$$Mg(H_2PO_4)_2 \rightarrow (MgHPO_4 + H_3PO_4) \quad (1)$$

Upon further heating, secondary phosphate salts can be converted to tertiary phosphate salts. For example, in the case of magnesium secondary phosphate,

$$3MgHPO_4 \rightarrow Mg_3(PO_4)_2 + H_3PO_4 \quad (2)$$

These chemical reactions are strongly affected not only by the baking temperature but also by the type of hydrogen phosphate salt used and the proportion of the metal atoms or various reaction accelerators that may be used, and these naturally produce a large difference in the final state of the reaction; in any case, however, the reaction proceeds by heating when a hydrogen phosphate salt is used.

The present inventors focused on the free phosphoric acid that is released by the hydrogen phosphate salt upon heating. When the hydrogen phosphate salt-containing coating solution is applied to a steel sheet surface and hewed to dryness, and the reaction temperature reaches a certain point depending on the type of hydrogen phosphate salt used, free phosphoric acid is released from the hydrogen phosphate salt. For example, in the case of magnesium primary phosphate, it is assumed that one phosphoric acid molecule is released per molecule, according to chemical equation (1) above. According to the invention, the freed phosphoric acid is actively utilized to ensure high corrosion resistance.

The free phosphoric acid that is generated has the effect of flattening the surface at the interface between the first layer anal second layer when the aluminum borate coating is crystallized, and therefore the aluminum borate coating surface of the second layer is also flattened, thus affecting crystallization of the aluminum borate and reducing the surface roughness.

In other words, the second layer used according to the invention includes a tension-imparting layer composed mainly of aluminum borate, and it is believed that the high affinity for aluminum of the phosphoric acid freed from the hydrogen phosphate salt-in the first layer during the heating to dryness of the second layer renders it highly miscible with the aluminum borate used in the second layer and increases the cohesion between the first and second layers while also forming a dense, tough coating, thereby providing excellent corrosion resistance.

In addition, since the hydrogen phosphate salt of the first layer of the invention is amorphous, the crystals of the aluminum borate coating of the second layer are less active as nuclei for growth, and since the crystals therefore do not grow large, the surface roughness is lower and the space factor is improved.

In order to further improve the corrosion resistance according to the invention, chromium oxide may also be added to the first layer. Also, free phosphoric acid may be added to the first layer to complement the free phosphoric acid from the hydrogen phosphate salt in the first layer. Addition of an excess of free phosphoric acid will result in an excess of free phosphoric acid in the first layer, and therefore the combined use of chromium oxide not only improves the corrosion resistance but can also prevent "sticking", or seizing which occurs during the stress-relief annealing as a result of excess phosphoric acid.

EXAMPLE 1

A grain-oriented electromagnetic steel sheet with a thickness of 0.23 mm containing 3.1% Si and having a finished and annealed primary coating and a grain-oriented electromagnetic steel sheet with a mirror surface created using alumina powder as the annealing separator during the finishing annealing was used as test samples, and aqueous solutions with the compositions listed in Table 1 were baked for 20 seconds at the sheet temperatures listed in Table 2 to form film thicknesses of 1 $\mu$m. Aqueous solutions with the compositions listed in Table 3 were then applied to a film thickness of 3 $\mu$m and baked in a furnace at 950° C. for one minute.

The results for the magnetic properties and coating properties of grain-oriented electromagnetic steel sheets obtained in the manner described above are shown in Table 4. For measurement of the magnetic properties, stress-relief annealing was performed at 800° C.×2 hours in order to exclude stress during fabrication of the samples.

As a comparative example (No. 11 in Table 4), an aqueous solution with the composition listed in Table 3 was applied as a first layer to a thickness of 3 $\mu$m, and after baking in a furnace at 950° C. for 1 minute, an aqueous solution with the composition listed as Solution No. 2 in Table 1 was applied as a second layer and baked at 900° C. for 20 seconds to a thickness of 1 $\mu$m.

As another comparative example (No. 12 in Table 4), the coating solution composed mainly of aluminum phosphate, chromic acid and colloidal silica disclosed in Japanese Unexamined Patent Publication No. 50-79492 was baked in a furnace at 850° C. for 1 minute to a thickness of 4 $\mu$m.

As shown in the tables, the present invention provided superior magnetic properties, corrosion resistance, cohesion and space factor.

TABLE 1

| Solution No. | Type of phosphate salt (pts. by wt.) | Colloidal silica (pts. by wt.) | Phosphoric acid (pts. by wt.) | Chromic acid (pts. by wt.) |
|---|---|---|---|---|
| 1 | Al primary phosphate (30) | 20 | | |
| 2 | Mg primary phosphate (20) | 20 | 0.1 | 3 |
| 3 | Al primary phosphate (20) Ca primary phosphate (10) | 15 | | |
| 4 | Al primary phosphate (20) Mg primary phosphate (5) | 20 | | 5 |
| 5 | Na primary phosphate (20) | 10 | | |
| 6 | Al tertiary phosphate (20) | 20 | | 5 |

TABLE 2

| No. | Solution No. | Baking sheet temperature (° C.) | Test material | Remark |
|---|---|---|---|---|
| 1 | 1 | 400 | with primary coating | present inv. |
| 2 | 2 | 250 | with primary coating | present inv. |
| 3 | 3 | 450 | with primary coating | present inv. |
| 4 | 3 | 350 | with primary coating | present inv. |
| 5 | 4 | 400 | with primary coating | present inv. |
| 6 | 1 | 250 | mirror surface | present inv. |
| 7 | 3 | 100 | with primary coating | comp. ex. |
| 8 | 4 | 700 | with primary coating | comp. ex. |
| 9 | 5 | 900 | with primary coating | comp. ex. |
| 10 | 6 | 300 | with primary coating | comp. ex. |

TABLE 3

| Starting material | Pts. by wt. (solid) |
|---|---|
| boric acid | 30 |
| boehmite sol | 50 |

TABLE 4

| No. | Iron loss (W17/50) | Corrosion resistance (a) | Cohesion (b) | Surface roughness (c) | Space factor (%) | Remark |
|---|---|---|---|---|---|---|
| 1 | 0.75 | 8 | ○ | 0.22 | 97.1 | present inv. |
| 2 | 0.74 | 9 | ○ | 0.22 | 97.2 | present inv. |

TABLE 4-continued

| No. | Iron loss (W17/50) | Corrosion resistance (a) | Cohesion (b) | Surface roughness (c) | Space factor (%) | Remark |
|---|---|---|---|---|---|---|
| 3 | 0.75 | 7 | ○ | 0.19 | 97.5 | present inv. |
| 4 | 0.75 | 7 | ○ | 0.20 | 97.2 | present inv. |
| 5 | 0.77 | 8 | ○ | 0.21 | 97.2 | present inv. |
| 6 | 0.67 | 8 | ○ | 0.24 | 98.1 | present inv. |
| 7 | 0.78 | 5 | · | 0.18 | 97.3 | comp. ex. |
| 8 | 0.81 | 5 | ○ | 0.35 | 97.2 | comp. ex. |
| 9 | 0.77 | 1 | ○ | 0.31 | 97.1 | comp. ex. |
| 10 | 0.78 | 1 | ○ | 0.70 | 96.7 | comp. ex. |
| 11 | 0.80 | 3 | Δ | 0.38 | 96.5 | prior art |
| 12 | 0.83 | 8 | ○ | 0.22 | 97.1 | prior art |

(Notes)
(a): 5% salt spray, 5 hours, 50° C., 10-point visual evaluation, passing = ≧7
(b): Peeling with cellophane tape; ⊚ = no adhesion, ○ little adhesion, Δ = large adhesion, · = peeling
(c): Ra (center line average roughness), μm, average value for L direction and C direction of sample)

As explained above, the present invention provides a high space factor, grain-oriented electromagnetic steel sheet with a higher tension-imparting effect and more excellent cohesion and magnetic properties compared to the prior art, while maintaining sufficient corrosion resistance to withstand practical use.

What is claimed is:

1. A grain-oriented electromagnetic steel sheet with excellent coating properties, characterized in that the steel sheet surface has an insulation coating comprising a first layer composed mainly of a divalent or trivalent metal hydrogen phosphate salt and silica, and a second layer composed mainly of aluminum borate, and having a surface roughness of 0.1 μm–0.50 μm in terms of Ra (center line average roughness).

2. A grain-oriented electromagnetic steel sheet with excellent coating properties according to claim 1, characterized in that the hydrogen phosphate salt of the first layer is one or a mixture of two or more from among aluminum primary phosphate, magnesium primary phosphate and calcium primary phosphate.

3. A grain-oriented electromagnetic steel sheet with excellent coating properties according to claim 1, characterized in that the first layer further contains free phosphoric acid.

4. A grain-oriented electromagnetic steel sheet with excellent coating properties according to claim 1, characterized in that the first layer further contains chromium oxide.

5. A process for the manufacture of a grain-oriented electromagnetic steel sheet with excellent properties, characterized in that, for formation of a first layer containing a hydrogen phosphate salt or silica as the main component, a coating solution with that composition is applied to the steel sheet and then dried and baked at 200–600° C. and, for subsequent formation of a second layer containing aluminum borate as the main component, a coating solution with that composition is applied thereto and then dried and baked at 800–1200° C.

6. A process for the manufacture of a grain-oriented electromagnetic steel sheet with excellent properties according to claim 5, characterized in that for the drying and baking of the second layer, the temperature elevating rate up to 400° C. is from 15° C./sec to 25° C./sec.

7. A grain-oriented electromagnetic steel sheet with excellent coating properties, characterized in that the steel sheet surface has an insulation coating comprising a first layer composed mainly of a divalent or trivalent metal hydrogen phosphate salt and silica, and a second layer composed mainly of aluminum borate,
wherein the first layer further contains free phosphoric acid.

8. A grain-oriented electromagnetic steel sheet with excellent coating properties, characterized in that the steel sheet surface has an insulation coating comprising a first layer composed mainly of a divalent or trivalent metal hydrogen phosphate salt and silica, and a second layer composed mainly of aluminum borate,
wherein the first layer further contains chromium oxide.

9. A grain-oriented electromagnetic steel sheet with excellent coating properties according to claim 7, wherein the first layer further contains chromium oxide.

10. A grain-oriented electromagnetic steel sheet with excellent coating properties according to claim 7, characterized in that the hydrogen phosphate salt of the first layer is one or a mixture of two or more from among aluminum primary phosphate, magnesium primary phosphate and calcium primary phosphate.

11. A grain-oriented electromagnetic steel sheet with excellent coating properties according to claim 8, characterized in that the hydrogen phosphate salt of the first layer is one or a mixture of two or more from among aluminum primary phosphate, magnesium primary phosphate and calcium primary phosphate.

* * * * *